(12) United States Patent
Yamasaki et al.

(10) Patent No.: US 12,208,728 B2
(45) Date of Patent: Jan. 28, 2025

(54) VEHICLE WITH ROAD SURFACE IMAGE RENDERING FUNCTIONALITY

(71) Applicant: SUBARU CORPORATION, Tokyo (JP)

(72) Inventors: Kentarou Yamasaki, Tokyo (JP); Makoto Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/431,697

(22) Filed: Feb. 2, 2024

(65) Prior Publication Data

US 2024/0270158 A1 Aug. 15, 2024

(30) Foreign Application Priority Data

Feb. 14, 2023 (JP) .................................. 2023-021183

(51) Int. Cl.
*B60Q 1/14* (2006.01)
*B60Q 1/50* (2006.01)
*B60S 1/56* (2006.01)
*G06V 20/56* (2022.01)

(52) U.S. Cl.
CPC .............. *B60Q 1/143* (2013.01); *B60Q 1/50* (2013.01); *B60S 1/566* (2013.01); *G06V 20/588* (2022.01); *B60Q 2400/50* (2013.01)

(58) Field of Classification Search
CPC ........ B60Q 1/143; B60Q 1/50; G06V 20/588; B60S 1/566
See application file for complete search history.

(56) References Cited

U.S. PATENT DOCUMENTS

| 10,134,283 B2 | 11/2018 | Masuda et al. |
| 10,654,401 B2 | 5/2020 | Koji et al. |
| 11,066,006 B2 * | 7/2021 | Kitazawa ................ F21S 41/65 |
| 2018/0173237 A1 * | 6/2018 | Reiley .................. G05D 1/0061 |
| 2018/0257549 A1 * | 9/2018 | Suzuki ..................... B60Q 1/04 |

(Continued)

FOREIGN PATENT DOCUMENTS

| JP | 2015-164828 A | 9/2015 |
| JP | 2016-055691 A | 4/2016 |

(Continued)

*Primary Examiner* — Bryon T Gyllstrom
(74) *Attorney, Agent, or Firm* — Rimon P.C.

(57) ABSTRACT

A vehicle with road surface image rendering functionality includes: a light projection member configured to perform light projection for road surface image rendering toward a road surface in front of the vehicle; a controller configured to control the light projection by the light projection member; and a detection device configured to perform detection of a state where the light projection member is performing the light projection. The controller is configured to: cause the light projection member to perform the light projection; determine, based on the detection by the detection device, whether the light projection member is suitable for the light projection; when the light projection member is suitable for the light projection, start the light projection from the light projection member; and, when the light projection member is unsuitable for the light projection for the road surface image rendering, prohibit the light projection by the light projection member.

9 Claims, 8 Drawing Sheets

(56) References Cited

U.S. PATENT DOCUMENTS

| | | | | |
|---|---|---|---|---|
| 2018/0349711 A1* | 12/2018 | Prasad | ................. | B60W 50/14 |
| 2021/0078448 A1* | 3/2021 | Kaku | ..................... | B60N 2/002 |
| 2022/0118976 A1* | 4/2022 | Wiesenberg | .......... | B60W 30/16 |
| 2023/0296394 A1* | 9/2023 | Lee | ..................... | G06V 20/588 |
| | | | | 701/436 |

FOREIGN PATENT DOCUMENTS

| JP | 2016-215877 A | 12/2016 |
|---|---|---|
| JP | 2020-111284 A | 7/2020 |

* cited by examiner

VEHICLE WITH ROAD SURFACE IMAGE RENDERING FUNCTIONALITY

CROSS-REFERENCE TO RELATED APPLICATIONS

The present application claims priority from Japanese Patent Application No. 2023-021183 filed on Feb. 14, 2023, the entire contents of which are hereby incorporated by reference.

BACKGROUND

The disclosure relates to a vehicle with road surface image rendering functionality.

Japanese Unexamined Patent Application Publication (JP-A) Nos. 2016-055691, 2020-111284, 2015-164828, and 2016-215877 disclose that, by projecting light from a vehicle, various patterns are rendered on a road surface on which the vehicle is traveling.

By rendering such patterns on the road surface, the vehicle can provide information related to its traveling, etc. to the driver who is driving the vehicle and to others through the road surface.

SUMMARY

An aspect of the disclosure provides a vehicle with road surface image rendering functionality. The vehicle includes a light projection member, a controller, and a detection device. The light projection member is configured to perform light projection for road surface image rendering toward a road surface in front of the vehicle. The controller is configured to control the light projection for the road surface image rendering by the light projection member. The detection device is configured to perform detection of a state in which the light projection member is performing the light projection. The controller is configured to: cause the light projection member to perform the light projection for the road surface image rendering; determine, based on the detection by the detection device, whether the light projection member is in a state suitable for the light projection for the road surface image rendering; when the light projection member is suitable for the light projection for the road surface image rendering, start the light projection for road surface image rendering from the light projection member; and, when the light projection member is unsuitable for the light projection for the road surface image rendering, prohibit the light projection for the road surface image rendering by the light projection member.

An aspect of the disclosure provides a vehicle with road surface image rendering functionality. The vehicle includes a light projection member, circuitry, and a detection device. The light projection member is configured to perform light projection for road surface image rendering toward a road surface in front of the vehicle. The circuitry is configured to control the light projection for the road surface image rendering by the light projection member. The detection device is configured to perform detection of a state in which the light projection member is performing the light projection. The circuitry is configured to: cause the light projection member to perform the light projection for the road surface image rendering; determine, based on the detection by the detection device, whether the light projection member is in a state suitable for the light projection for the road surface image rendering; when the light projection member is suitable for the light projection for the road surface image rendering, start the light projection for road surface image rendering from the light projection member; and, when the light projection member is unsuitable for the light projection for the road surface image rendering, prohibit the light projection for the road surface image rendering by the light projection member.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Incidentally, a defect may occur in a light projection member used for rendering a road surface image described above on the road surface.

Then, if the defective light projection member projects light for road surface image rendering, the road surface image may be recognized as a shape different from a light projection pattern serving as the basis thereof. If such a road surface image is rendered on the road surface, it may be difficult for the driver who is driving the vehicle to be warned and for pedestrians and others to see and recognize the image. In addition, depending on missing elements in the road surface image, it may give information based on the inaccurate image.

In such a vehicle capable of rendering road surface images, it is desirable to be able to ensure that the light projection member operates properly.

Figure 1:
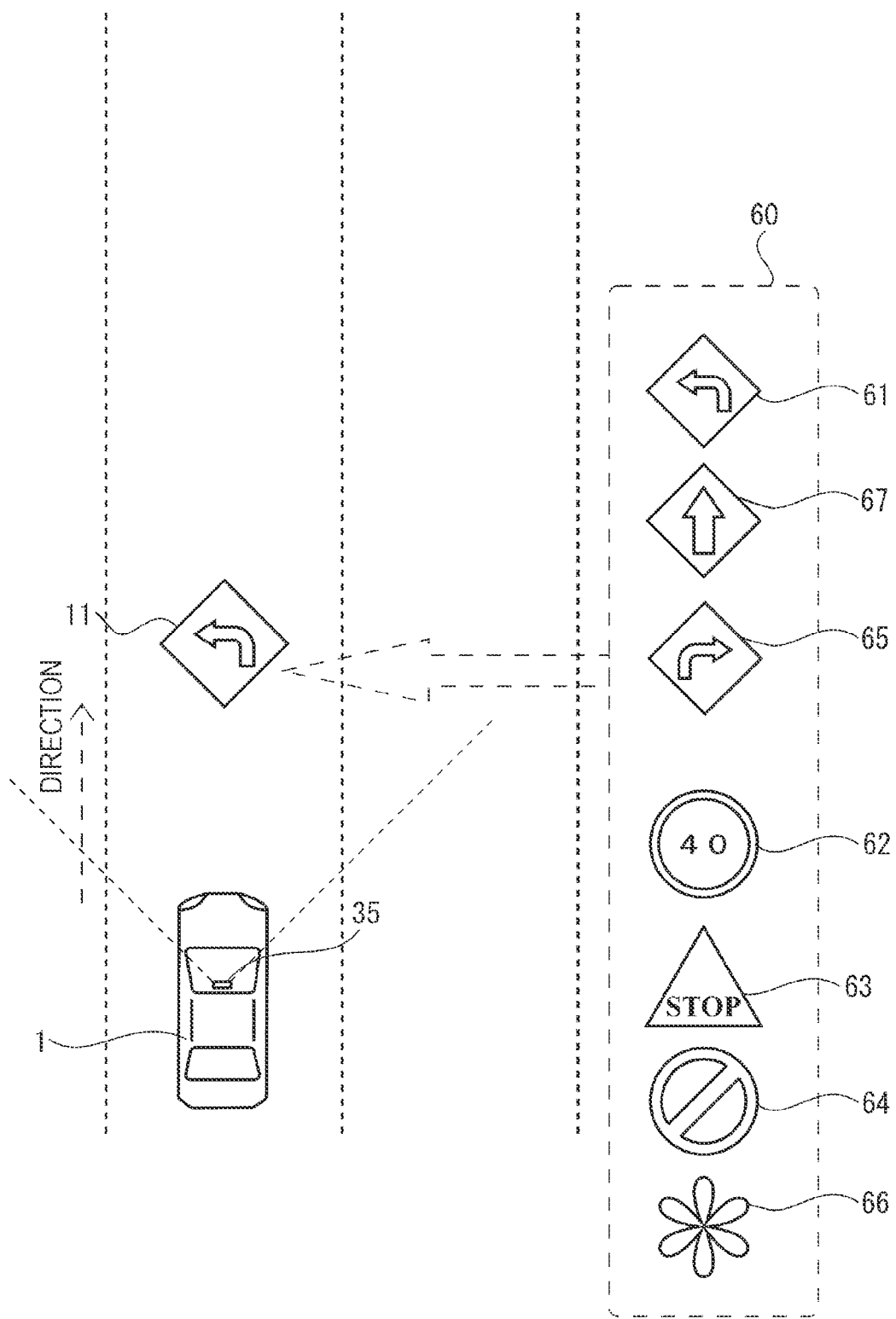
FIG. 1 is a descriptive diagram of an example of a traveling state of a vehicle according to an embodiment of the disclosure.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. FIG. 1 is a descriptive diagram of an example of a traveling state of a vehicle 1 such as an automobile according to an embodiment of the disclosure.

FIG. 1 illustrates the vehicle 1, which travels on a single-lane road. The automobile is an example of the vehicle 1. Other examples of the vehicle 1 include buses, trucks, motor cycles, personal mobility devices, and the like. Note that the vehicle 1 may be capable of traveling by autonomous driving including drive assistance.

In such a traveling environment, the driver who is driving the vehicle 1 operates the vehicle 1 to travel so as not to deviate from the lane where the vehicle 1 is traveling, while paying attention to the front side, which is the direction of travel of the vehicle 1, for example. In addition, if the traveling environment is dark at night, the vehicle 1 may turn on the headlamps.

By the way, with regard to the vehicle 1 as such, it has been researched to draw a graphical figure by irradiating the road surface with visible light from the vehicle 1.

For example, FIG. 1 illustrates a road surface image 11 using a simplified graphical figure imitating a road sign or the like. Here, the road surface image 11 is rendered in front of the vehicle 1 in its direction of travel for the driver of the vehicle 1 and for others. Note that there are other things that are drawn on the road surface, such as lane boundaries that extend along the left and right sides of the lane in which the vehicle 1 travels, a road shoulder boundary drawn to the road shoulder side of the vehicle 1 for pedestrians, and the like.

Also illustrated on the right side of FIG. 1 are multiple light projection patterns 60 that serve as the basis for the road surface image 11. Here, the following are exemplified: a light projection pattern 61 indicating a left turn, a light projection pattern 67 indicating to proceed straight, a light projection pattern 65 indicating a right turn, a light projection pattern 62 for speed limit, a light projection pattern 63 for indicating the stop position, a light projection pattern 64 for indicating no crossing, and a light projection pattern 66 with a pictogram for snow and ice caution alert. The vehicle 1 may simply select any of the light projection patterns 60 according to the traveling state and traveling environment of the vehicle 1 and execute light projection corresponding to the light projection pattern.

By rendering a pattern such as the road surface image 11 on the road surface, the vehicle 1 can provide information related to its traveling, etc. to the driver who is driving the vehicle and to others through the road surface.

Incidentally, a defect may occur in a light projection modules(s) 53, which serves as a light projection member(s) used for rendering the road surface image 11 as mentioned above on the road surface. That is, the light projection member(s) may include a light source.

In particular, it has been proposed for the light projection modules 53 to draw the road surface image 11 on the road surface by driving a micro-electromechanical systems (MEMS) mirror or the like to reflect the light of a light source and scan the road surface. The MEMS mirror is supported relative to a mirror housing, etc., through a coil damper structure in order to be drivable. By applying current to the coil damper structure, the MEMS mirror changes its direction and is driven. It is believed that such MEMS mirrors are susceptible to vibrations and the like while the vehicle 1 is traveling. MEMS mirrors may deteriorate in a way that they are driven into a different state from the initial one, even if there are no malfunctions to disable driving.

Then, if light is projected for road surface image rendering from the light projection module(s) 53 where such a defect is occurring, the road surface image 11 may be recognized as having a shape different from the light projection pattern serving as the basis thereof. If the road surface image 11 as such is drawn on the road surface, the image may be difficult to see for the driver who is driving the vehicle 1 and who is to be warned and for pedestrians and others. In addition, depending on missing elements in the road surface image 11, it may give information based on the inaccurate image.

In the vehicle 1 as such capable of rendering road surface images, it is desirable to be able to ensure that the light projection modules 53 operate properly.

Figure 2:
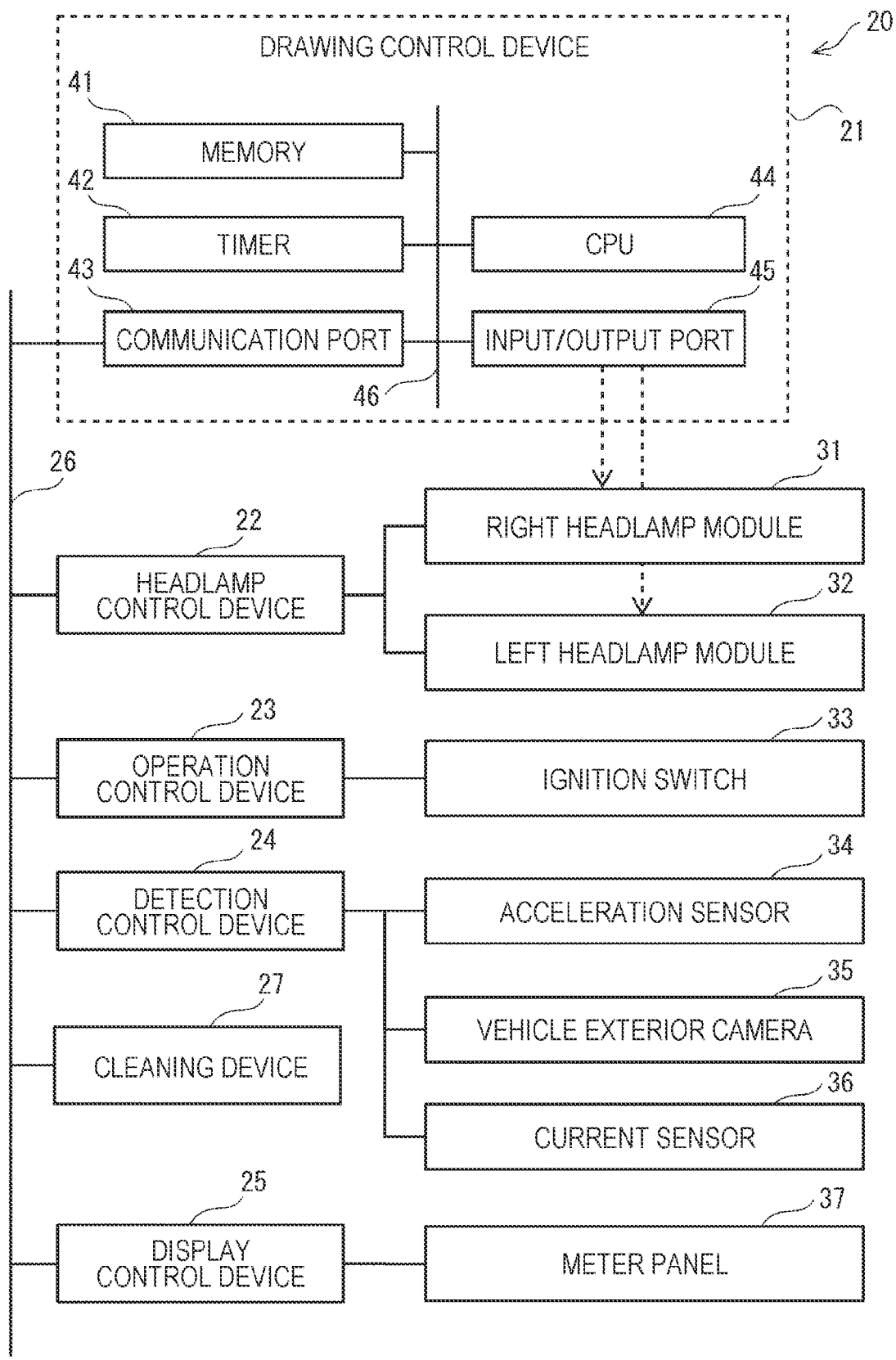
FIG. 2 is a descriptive diagram of a control system provided in the vehicle illustrated in FIG. 1.

FIG. 2 is a descriptive diagram of a control system 20 provided in the vehicle 1 illustrated in FIG. 1.

The control system 20 of the vehicle 1 illustrated in FIG. 2 has control devices and a vehicle network 26 to which the control devices are connected.

The vehicle network 26 may be a wired communication network compliant with, for example, Controller Area Network (CAN) and Local Interconnect Network (LIN) for the vehicle 1. The vehicle network 26 may be a communication network, such as a local area network (LAN), or a combination of the foregoing networks. The vehicle network 26 may partially include a wireless communication network. Various devices described above that are connected to the vehicle network 26 can send and receive information to and from each other through the vehicle network 26.

Moreover, FIG. 2 illustrates examples of the control devices, including a rendering control device 21, a headlamp control device 22, an operation control device 23, a detection control device 24, a display control device 25, and a cleaning device 27. Other control devices, including a travel control device and an air conditioning control device, may be connected to the vehicle network 26. Also, each control device illustrated in FIG. 2 may be divided into multiple parts and these multiple parts may be connected to the vehicle network 26.

A right headlamp module 31 and a left headlamp module 32 provided in a front end 50 of the vehicle 1 are connected to the headlamp control device 22. The right headlamp module 31 and the left headlamp module 32 are headlamp members configured to project light onto the front side of the vehicle 1.

Furthermore, the right headlamp module 31 and the left headlamp module 32 of the present embodiment have the light projection modules 53 for road surface image rendering, as will be described later. In the present embodiment, the light projection module 53 of the right headlamp module 31 and the light projection module 53 of the left headlamp module 32 each serve as, in the traveling vehicle 1, a light projection member capable of projecting the road surface image 11 on the road surface around the traveling vehicle 1 by projecting light for road surface image rendering.

The headlamp control device 22 controls the illumination state of the right headlamp module 31 and the illumination state of the left headlamp module 32 in response to information of the operation of a non-illustrated lamp operating lever and information of the detected value of a non-illustrated light intensity sensor for auto-light, obtained through the vehicle network 26. In general, the operating states of low beam lighting, high beam lighting, and off can be set to the lamp operating lever.

The headlamp control device 22 may then output information of the illumination state of the right headlamp module 31 and the left headlamp module 32 to other control devices through the vehicle network 26.

Various operating members for operation by an occupant, such as the driver, are connected to the operation control device 23. FIG. 2 illustrates an ignition switch 33 as an operating member. The ignition switch 33 serves as an operating member configured to be operated by an occupant of the vehicle 1 to enable the vehicle 1 to travel.

The operation control device 23 may then output information on the operating state of various operating members, such as the ignition switch 33, to other control devices through the vehicle network 26.

Various detection members for detecting the traveling state and the traveling environment of the vehicle 1 are connected to the detection control device 24. FIG. 2 illustrates an acceleration sensor 34, a vehicle exterior camera 35, and a current sensor 36 as examples of detection members.

The detection control device 24 may then output detection information of the acceleration sensor 34, etc. to other control devices through the vehicle network 26.

The acceleration sensor 34 detects the acceleration of the traveling vehicle 1. The acceleration sensor 34 may be one configured to detect triaxial acceleration.

The detection control device 24 may generate, from the triaxial acceleration of the acceleration sensor 34, information such as the angular velocity in each direction of roll, pitch, and yaw, the movement velocity and movement direction of the vehicle 1, etc.

The vehicle exterior camera 35 is provided facing forward in the cabin, which is inside the windshield of the vehicle 1, as illustrated in FIG. 1. The vehicle exterior camera 35 as such can capture images of the front side, which is the direction of travel of the vehicle 1, from a position that is approximately at the same height as the line of sight of the driver of the vehicle 1. Note that the vehicle exterior camera 35 may be a 360-degree camera or a stereo camera.

Then, images captured by the vehicle exterior camera 35 may include the road surface image 11 rendered by projecting light onto the road surface as the detected image thereof.

The vehicle exterior camera 35 provided in the vehicle 1 as such can serve as a detection device capable of detecting the road surface image 11 rendered on the road surface by the light projection modules 53.

In this case, the vehicle exterior camera 35 can detect the road surface image 11 rendered by light projection of the light projection modules 53.

The current sensor 36 detects the current consumed by the light projection modules 53 provided in the right headlamp module 31 and the left headlamp module 32. The current sensor 36 may be coupled to a closed circuit including a non-illustrated battery of the vehicle 1 and the light projection modules 53. This allows the current sensor 36 to detect the current value of the light projection modules 53 when the light projection modules 53, which serve as light projection members, project light.

A meter panel 37 is coupled to the display control device 25. The meter panel 37 may be, for example, a liquid crystal device. The meter panel 37 is provided in front of the driver of the vehicle 1 and displays the speed and warning light.

The display control device 25 then causes the meter panel 37 to display information obtained from the vehicle network 26. For example, if there is a defect in one of the light projection members and road surface image rendering is to be prohibited, the display control device 25 may obtain information thereof from the rendering control device 21 and display it on the meter panel 37.

The cleaning device 27 cleans the outer surface of the right headlamp module 31 and the outer surface of the left headlamp module 32 by spraying washer fluid onto the outer surfaces and wiping them off with wipers.

The cleaning device 27 can clean the outer surfaces of the headlamp modules 31 and 32 on which the light projection modules 53 serving as light projection members are provided.

The rendering control device 21 includes a memory 41, a timer 42, a communication port 43, an input/output port 45, a central processing unit (CPU) 44, and an internal bus 46 to which these components are coupled. Control devices provided in the control system 20 may basically have the same structure as the rendering control device 21.

The right headlamp module 31 and the left headlamp module 32 are coupled to the input/output port 45.

The communication port 43 is coupled to the vehicle network 26. The communication port 43 obtains information from the vehicle network 26, and outputs information output by the rendering control device 21 to the vehicle network 26.

The timer 42 measures time or clock time.

The memory 41 may include, for example, a semiconductor memory, a hard disk drive (HDD), random access memory (RAM), etc. The HDD is non-volatile memory. The RAM is volatile memory. The memory 41 records a program executed by the CPU 44 and various types of information used during execution of the program as data. The memory 41 may record, for example, data of the light projection patterns 60 illustrated in FIG. 1.

The CPU 44 reads and executes the program recorded in the memory 41. As a result, the CPU 44 serves as a controller of the rendering control device 21. In the present embodiment, the CPU 44 serves as a controller configured to control light projection for road surface image rendering by the light projection modules 53 as light projection members.

The CPU 44 as the controller controls the operation of the rendering control device 21. The CPU 44 as the controller also outputs signals to the right headlamp module 31 and the left headlamp module 32 through the input/output port 45. As a result, the CPU 44 as the controller controls the light projection modules 53 for road surface image rendering, which are provided in the right headlamp module 31 and the left headlamp module 32. The right headlamp module 31 and the left headlamp module 32 are illuminated with a light projection pattern for road surface image rendering. On the road surface, for example, as illustrated in FIG. 1, the road surface image 11 corresponding to the light projection pattern can be rendered.

In this way, the CPU 44 as the controller can control light projection for road surface image rendering by the light projection modules 53 in response to detection (captured image) of the vehicle exterior camera 35 as a detection device.

The CPU 44 may also determine whether the light projection modules 53 are in a state suitable for light projection for road surface image rendering based on the detection (captured image) of the vehicle exterior camera 35 and/or the current value detected by the current sensor 36, and control the execution or prohibition of light projection from the light projection modules 53. In this case, the vehicle exterior camera 35 or the current sensor 36 serves as a detection device capable of detecting a state in which the light projection modules 53 are projecting light. That is, the detection device may include a sensor.

Figure 3:
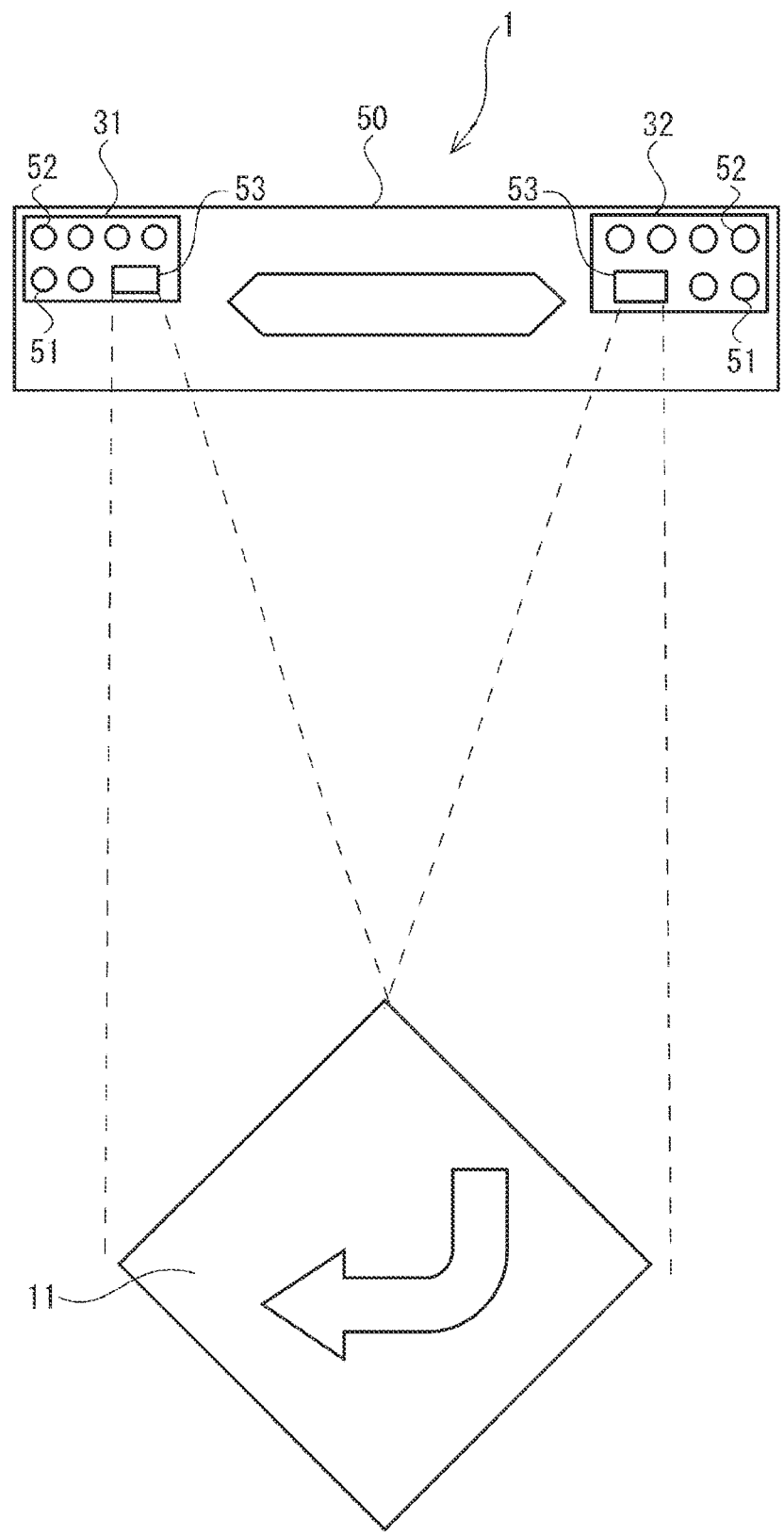
FIG. 3 is a schematic descriptive diagram of the structure and layout of a right headlamp module and a left headlamp module in the front end of the vehicle illustrated in FIG. 1.

FIG. 3 is a schematic descriptive diagram of the structure and layout of the right headlamp module 31 and the left headlamp module 32 in the front end 50 of the vehicle 1 illustrated in FIG. 1.

In FIG. 3, the front end 50 of the vehicle 1 is illustrated.

At the right end of the front end 50 of the vehicle 1, the right headlamp module 31 is provided. The right headlamp module 31 has light emitting diodes (LEDs) 51 for low beams, LEDs 52 for high beams, and the micro-electromechanical systems (MEMS) light projection module 53.

At the left end of the front end 50 of the vehicle 1, the left headlamp module 32 is provided. The left headlamp module 32 has LEDs 51 for low beams, LEDs 52 for high beams, and the MEMS light projection module 53.

Note that the light projection modules 53 may alternatively use mirrors in the digital micromirror device (DMD) format, for example.

Each MEMS light projection module 53 is a light projection member, and, for example, may be anything as long as it performs light projection by reflecting light from a trichromatic light source using a MEMS element. The MEMS mirror can be controlled by an image signal to adjust its reflection state.

The right headlamp module 31 or the left headlamp module 32 may also use something other than the MEMS light projection module 53 for rendering an image on the road surface.

The MEMS light projection modules 53 may be those capable of projecting light in and out of the range of illumination by the LEDs 51 for low beams and the LEDs 52 for high beams as a whole.

Then, in FIG. 3, the MEMS light projection module 53 of the right headlamp module 31 and the MEMS light projection module 53 of the left headlamp module 32 cooperate to project light and draw the road surface image 11 for indicating a right turn, corresponding to the light projection pattern 65 indicating a right turn, on the road surface. Note that the road surface image 11 can be rendered at any position and in any size within the range in which the two light projection modules 53 can project light.

In FIG. 3, the MEMS light projection module 53 of the right headlamp module 31 and the MEMS light projection module 53 of the left headlamp module 32 may separately draw multiple road surface images 11 on the road surface.

The CPU 44 as the controller can draw the road surface image 11 corresponding to the light projection pattern onto the road surface by controlling the MEMS light projection module 53 of the right headlamp module 31 and the MEMS light projection module 53 of the left headlamp module 32 according to the light projection pattern. In this way, the MEMS light projection module 53 of the right headlamp module 31 and the MEMS light projection module 53 of the left headlamp module 32 each can serve as a light projection member capable of projecting light, according to a light projection pattern, for road surface image rendering toward the road surface at least in front of the vehicle 1.

Figure 4:
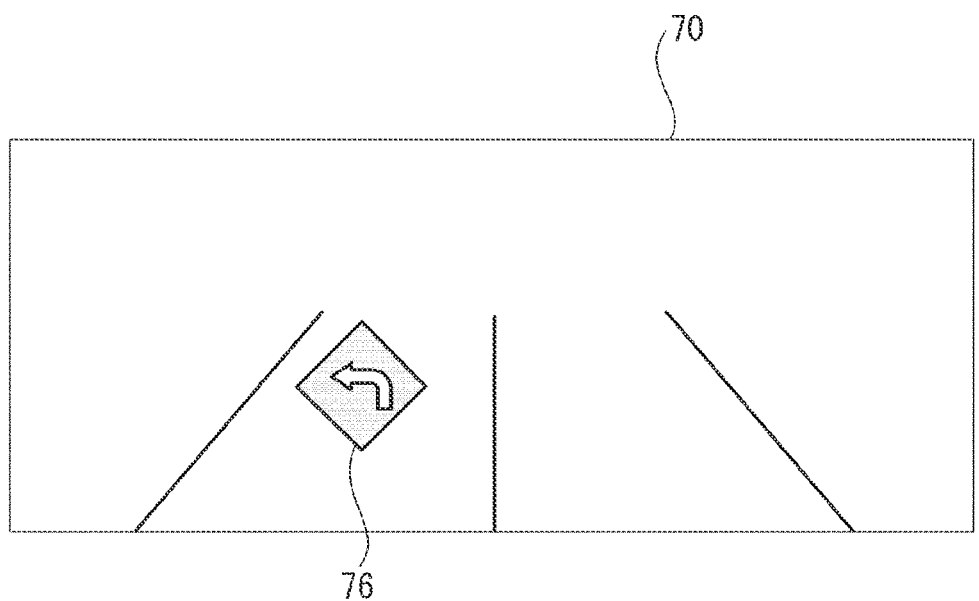
FIG. 4 is a descriptive diagram of an image captured by a vehicle exterior camera in a traveling state illustrated in FIG. 1.

FIG. 4 is a descriptive diagram of an image 70 captured by the vehicle exterior camera 35 in the traveling state illustrated in FIG. 1.

The captured image 70 illustrated FIG. 4 has been captured by the vehicle exterior camera 35 of the vehicle 1 in the traveling state illustrated in FIG. 1. In FIG. 4, the CPU 44 executes light projection by the light projection modules 53 to draw the road surface image 11 on the road surface.

Therefore, the captured image 70 illustrated in FIG. 4 includes, along with the road on which the vehicle 1 is traveling, a detected image 76 of the road surface image 11 rendered on the road surface of this road.

The captured image 70 of the vehicle exterior camera 35 can be an image that views the road surface ahead, which is the direction of travel of the vehicle 1, from a position that is approximately at the same height as the light of sight of the driver of the vehicle 1.

In this case, the driver of the vehicle 1 can see and recognize the road surface image 11 rendered on the road surface and easily understand the display content.

Figure 5:
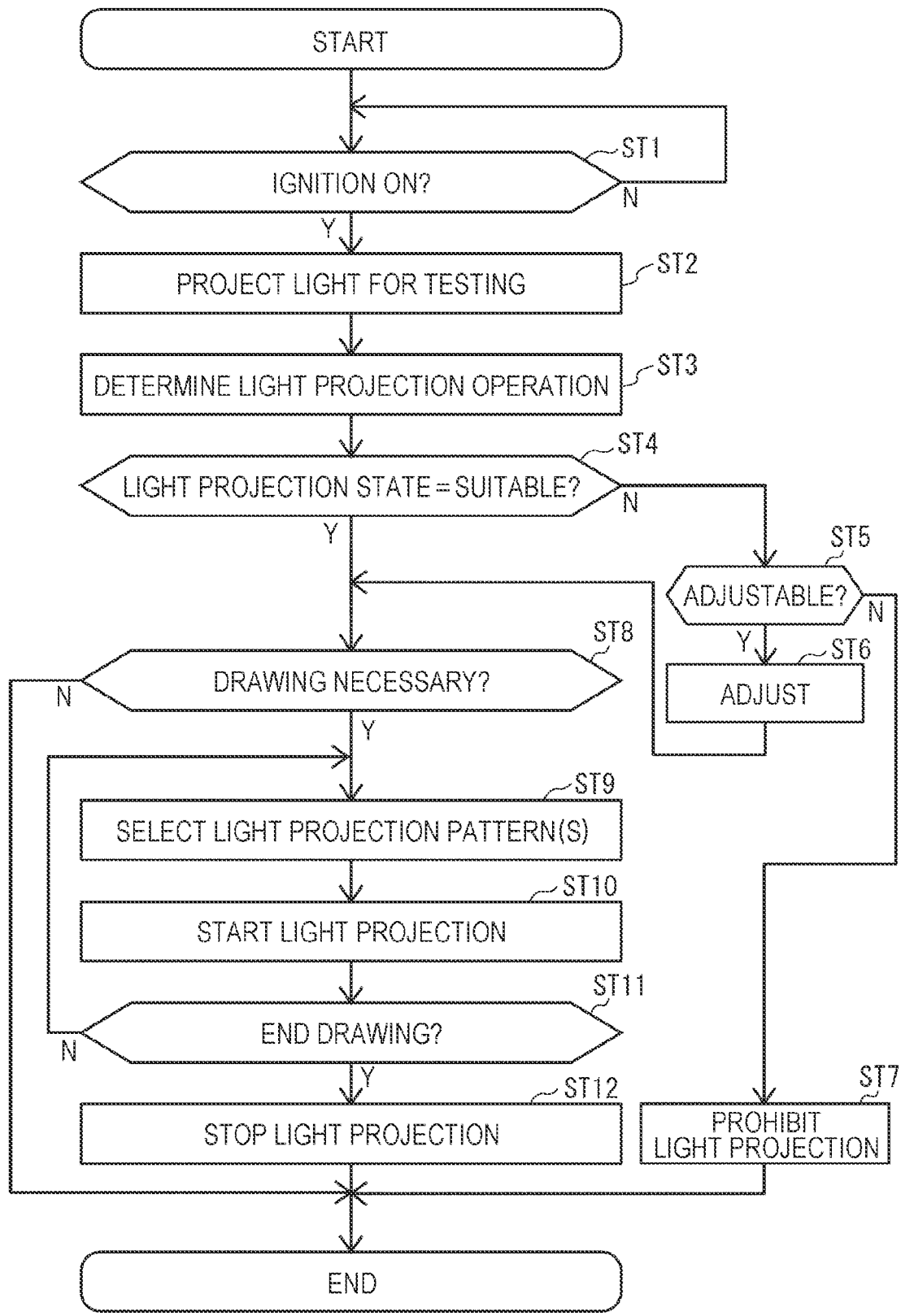
FIG. 5 is a flowchart of road surface image rendering control executed by a rendering control device illustrated in FIG. 2.

FIG. 5 is a flowchart of road surface image rendering control executed by the rendering control device 21 illustrated in FIG. 2.

The CPU 44 as a controller of the rendering control device 21 may repeatedly execute the road surface image rendering control illustrated in FIG. 5.

Note that, when rendering control functionality is implemented in the headlamp control device 22 in the control system 20, the CPU of the headlamp control device 22, as the controller, may repeatedly execute the road surface image rendering control illustrated in FIG. 5.

In step ST1, the CPU 44, which controls light projection for road surface image rendering, determines whether the ignition switch 33 has been operated into the ON state. When intending to drive the vehicle 1, the driver of the vehicle 1 operates the ignition switch 33 from the OFF state to the ON state. If the ignition switch 33 has not been operated into the ON state, the CPU 44 repeats the process. When the ignition switch 33 is operated into the ON state, the CPU 44 advances the process to step ST2.

In step ST2, the CPU 44 causes the light projection modules 53 as the light projection members to execute light projection for road surface image rendering using a test light projection pattern.

Figure 6:
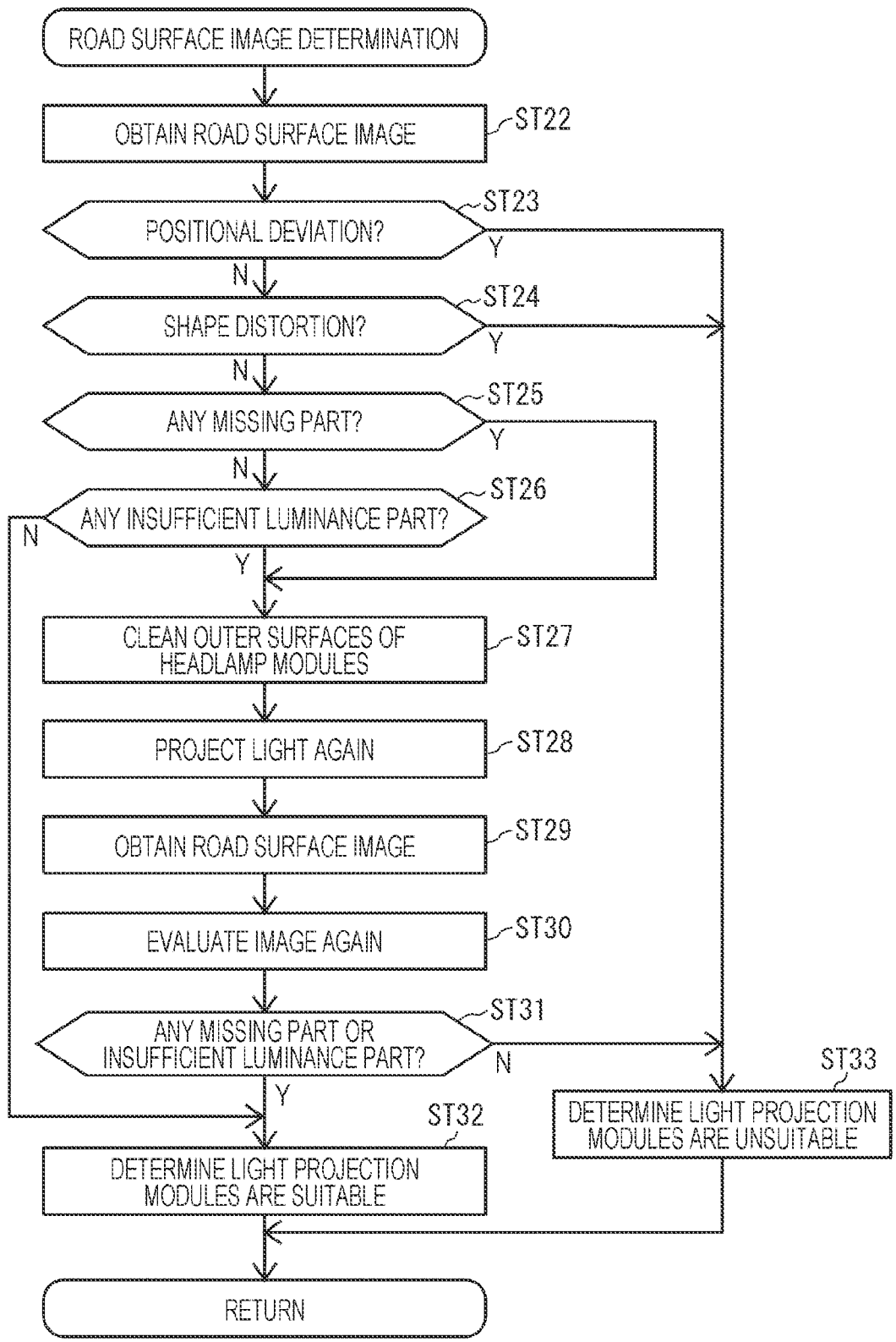
FIG. 6 is a flowchart of control for determining the suitability of light projection members based on road surface image rendering, executed in step ST3 of the road surface image rendering control illustrated in FIG. 5.
Figure 9:
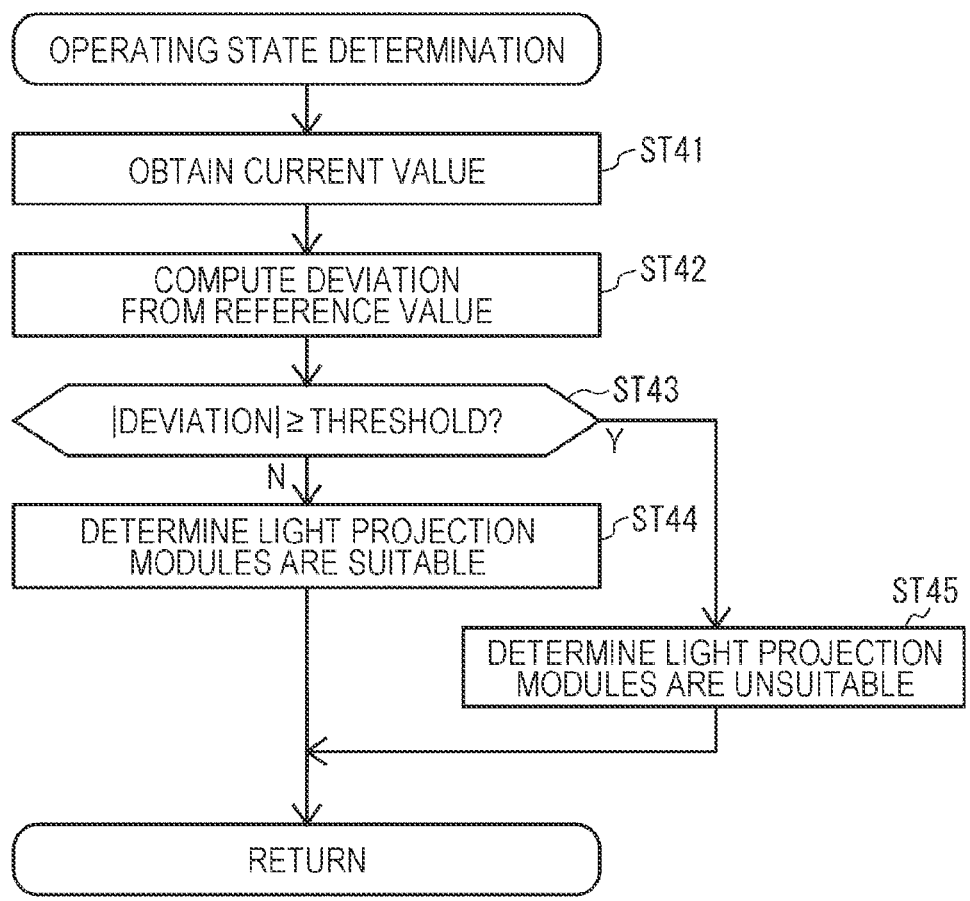
FIG. 9 is a flowchart of control for determining the suitability of the light projection members based on the operating state of the light projection members, executed in step ST3 of the road surface image rendering control illustrated in FIG. 5.

In step ST3, the CPU 44 determines whether the light projection modules 53, which are light-projecting the road surface image 11 based on the test light projection pattern, are in a state suitable for light projection for road surface image rendering. Here, the CPU 44 may execute determination control illustrated in FIGS. 6 and 9. The road surface image rendering determination control illustrated in FIG. 6 is one that determines, based on the captured image 70 of the vehicle exterior camera 35, whether the light projection modules 53 are in a state suitable for light projection for road surface image rendering. The operating state determination control illustrated in FIG. 9 is one that determines, based on the current value detected by the current sensor 36, whether the light projection modules 53 are in a state suitable for light projection for road surface image rendering.

In step ST4, the CPU 44 determines, based on the determination result of step ST3, whether the light projection modules 53 are in a state suitable for light projection for road surface image rendering.

If the light projection modules 53 are in a state suitable for light projection for road surface image rendering, the CPU 44 advances the process to step ST8 in order to start light projection for road surface image rendering from the light projection modules 53.

If the light projection modules 53 are not in a state suitable for light projection for road surface image rendering, the CPU 44 advances the process to step ST5.

In step ST5, the CPU 44 determines whether adjustment is possible for the light projection modules 53, which are not in a state suitable for light projection for road surface image rendering.

For example, if the position of the detected image 76 of the road surface image 11 in the captured image 70 is determined to be unsuitable because it deviates from the desired position, the CPU 44 may determine whether the deviation is adjustable.

If the positional deviation is adjustable, the CPU 44 determines that the adjustment is possible and advances the process to step ST6.

If the positional deviation is large and cannot be resolved through adjustment, the CPU 44 determines that the adjustment is not possible, and advances the process to step ST7.

Moreover, defects in the road surface image 11 may include, in addition to positional deviations, distortions in shape, missing elements, insufficient luminance, etc.

In these cases, it is difficult not to determine that the position of the detected image 76 of the road surface image 11 is unsuitable through adjustment. Accordingly, the CPU 44 may determine that the adjustment is not possible and advance the process to step ST7.

In step ST6, the CPU 44 adjusts the operation of the light projection modules 53 to suppress, for example, the positional deviation or the like.

The CPU 44 then advances the process to step ST8 to start light projection for road surface image rendering from the light projection modules 53.

In step ST7, since the determination that the position of the detected image 76 of the road surface image 11 is unsuitable through adjustment is unresolvable, the CPU 44 prohibits light projection for road surface image rendering by the light projection modules 53.

The CPU 44 then ends this control. In this case, the light projection modules 53 render no road surface image 11 on the road surface.

From step ST8, the CPU 44 starts light projection control for road surface image rendering. The CPU 44 first determines the necessity of road surface image rendering. A request for road surface image rendering may be generated by various control devices in the control system 20. For example, when the headlamp control device 22 is to cause the headlamps to be illuminated, the headlamp control device 22 may generate information requesting road surface image rendering and output it to the rendering control device 21 through the vehicle network 26. If there is a request for road surface image rendering, the CPU 44 advances the process to step ST9. If there is no request for road surface image rendering, the CPU 44 ends this control.

In step ST9, the CPU 44 selects, from among the light projection patterns 60 recorded in the memory 41, a light projection pattern to be used for road surface image rendering. The CPU 44 may select multiple light projection patterns.

In step ST10, the CPU 44 starts light projection for road surface image rendering. The CPU 44 controls the light projection module 53 of the right headlamp module 31 and the light projection module 53 of the left headlamp module 32 to irradiate the road surface with light according to the light projection pattern selected in step ST9. As a result, the road surface image 11 corresponding to the light projection pattern is rendered on the road surface.

In step ST11, the CPU 44 determines whether to end the rendering. The CPU 44 may determine to end the road surface image rendering if there is no request for road surface image rendering. In this case, the CPU 44 advances the process to step ST12.

In contrast, if a request for road surface image rendering remains, the CPU 44 determines not to end the road surface image rendering and returns the process to step ST9. In this case, the CPU 44 repeats the process from step ST9 to step ST11 to continue control for road surface image rendering.

In step ST12, the CPU 44 stops light projection for road surface image rendering. The CPU 44 controls the light projection module 53 of the right headlamp module 31 and the light projection module 53 of the left headlamp module 32 to stop light projection onto the road surface. The CPU 44 then ends this control.

In this way, the CPU 44 as the controller determines whether the light projection modules 53 are in a state suitable for light projection. Then, if the light projection modules 53 are in a state suitable for light projection, the CPU 44 executes road surface image rendering using the light projection modules 53. If the light projection modules 53 are not in a state suitable for light projection, the CPU 44 prohibits light projection for road surface image rendering from the light projection modules 53.

FIG. 6 is a flowchart of control for determining the suitability of the light projection members based on road surface image rendering, executed in step ST3 of the road surface image rendering control illustrated in FIG. 5.

Based on the fact that the ignition switch 33 as the operating member has been operated into the ON state, in step ST2 of FIG. 5, the CPU 44 causes the light projection modules 53 as the light projection members to execute light projection for road surface image rendering using a test light projection pattern, and then executes control for determining the suitability of the light projection members based on road surface image rendering, which is illustrated in FIG. 6.

In step ST22, the CPU 44 obtains the captured image 70 from the vehicle exterior camera 35 in a state where the light projection modules 53 are light-projecting the test light projection pattern.

From step ST23, the CPU 44 starts an evaluation based on the detected image 76 of the road surface image 11 included in the captured image 70 of the vehicle exterior camera 35. The CPU 44 first determines whether the position of the detected image 76 of the road surface image 11 is the desired position.

If the position of the detected image 76 is the desired position, the CPU 44 advances the process to step ST24.

If the position of the detected image 76 is deviated from the desired position, the CPU 44 advances the process to step ST33.

In step ST24, the CPU 44 compares the shape of the detected image 76 of the road surface image 11 with, for example, the shape of the test light projection pattern to determine whether the shape of the detected image 76 is distorted.

If the shape of the detected image 76 matches the shape of the test light projection pattern, it means that the shape of the detected image 76 is not distorted, and the CPU 44 advances the process to step ST25.

If the shape of the detected image 76 does not match the shape of the test light projection pattern, it means that the shape of the detected image 76 is distorted, and the CPU 44 advances the process to step ST33.

In step ST25, the CPU 44 compares the detected image 76 of the road surface image 11 with, for example, the test light projection pattern to determine whether there is any image missing element occurring in the detected image 76.

If there is no image missing element greater than or equal to a certain proportion occurring in the detected image 76, it means that there is no image missing element occurring in the detected image 76, and the CPU 44 advances the process to step ST26.

If there is an image missing element greater than or equal to the certain proportion occurring in the detected image 76, it means that there is an image missing element occurring in the detected image 76, and the CPU 44 advances the process to step ST27.

In step ST26, the CPU 44 determines whether there is an insufficient luminance part occurring in the detected image 76 of the road surface image 11.

If there is no insufficient luminance part greater than or equal to a certain proportion occurring in the detected image 76, it means that there is no insufficient luminance part occurring in the detected image 76, and the CPU 44 advances the process to step ST32.

If there is an insufficient luminance part greater than or equal to the certain proportion occurring in the detected image 76, it means that there is an insufficient luminance part occurring in the detected image 76, and the CPU 44 advances the process to step ST27.

In this way, the CPU 44 as the controller evaluates the position, distortions in shape, missing elements, and insufficient luminance of the road surface image 11 included in the captured image 70 of the vehicle exterior camera 35 by comparing them with the test light projection pattern and thresholds. Based on this evaluation, the CPU 44 can determine whether the light projection modules 53 as the light projection members are in a state suitable for light projection for road surface image rendering.

In step ST27, the CPU 44 activates the cleaning device 27. The cleaning device 27 cleans the outer surface of the right headlamp module 31 and the outer surface of the left headlamp module 32 where the light projection modules 53 as the light projection members are provided. As a result, dirt adhering to the outer surfaces of the light projection modules 53 can be removed.

If it is determined, for the first light projection of the light projection members, that the light projection members are unsuitable for light projection for road surface image rendering due to any missing element or insufficient luminance in the road surface image 11, the CPU 44 can activate the cleaning device 27.

In step ST28, the CPU 44 causes the light projection modules 53 that have been cleaned to light-project the test light projection pattern again. As a result, the road surface image 11 based on the test light projection pattern can be rendered on the road surface again.

In step ST29, the CPU 44 obtains the captured image 70 from the vehicle exterior camera 35 again in a state where the light projection modules 53 are light-projecting the test light projection pattern.

In step ST30, the CPU 44 evaluates the road surface image 11 again based on the captured image 70 that has been obtained again in step ST29.

In step ST31, the CPU 44 determines again whether the light projection modules 53 that have been cleaned are in a light state suitable for light projection for road surface image rendering based on the evaluation of the captured image 70 that has been obtained again in step ST30.

Here, the CPU 44 at least evaluates the occurrence of a missing element and an insufficient luminance part.

Then, if there is no image missing element greater than or equal to the certain proportion occurring in the detected image 76 of the road surface image 11, and if there is no insufficient luminance part greater than or equal to the certain proportion occurring in the detected image 76, the CPU 44 advances the process to step ST32.

In contrast, if there is an image missing element greater than or equal to the certain proportion occurring in the detected image 76 of the road surface image 11, or if there is an insufficient luminance part greater than or equal to the certain proportion occurring in the detected image 76, the CPU 44 advances the process to step ST33.

In step ST32, the CPU 44 determines that the light projection modules 53 are in a state suitable for light projection for road surface image rendering.

Here, when the light projection modules 53 that have been cleaned are in a state suitable for road surface image rendering, the CPU 44 can also determine that the light projection modules 53 are in a state suitable for light projection for road surface image rendering. In this case, the CPU 44 may advance the process in FIG. 5 to step ST8 to start light projection for road surface image rendering from the light projection modules 53.

In step ST33, the CPU 44 determines that the light projection modules 53 are in a state unsuitable for light projection for road surface image rendering.

Here, when the light projection modules 53 that have been cleaned are not in a state suitable for road surface image rendering, the CPU 44 can also determine that the light projection modules 53 are in a state unsuitable for light projection for road surface image rendering. In this case, the CPU 44 may advance the process in FIG. 5 to step ST7 to prohibit light projection from the light projection modules 53. The road surface image 11 is no longer rendered on the road surface.

Figure 7:
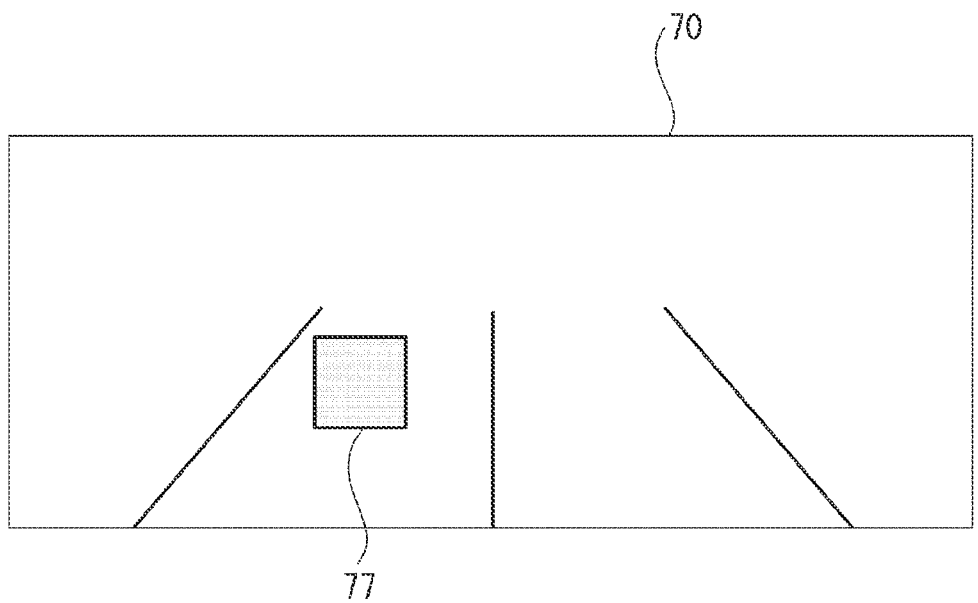
FIG. 7 is a descriptive diagram of an image captured by the vehicle exterior camera in a state where the light projection members are light-projecting a test light projection pattern.

FIG. 7 is a descriptive diagram of the captured image 70 of the vehicle exterior camera 35 in a state where the light projection modules 53 are light-projecting a test light projection pattern.

In FIG. 7, the CPU 44 executes light projection by the light projection modules 53 to draw the road surface image 11 corresponding to a test light projection pattern on the road surface.

Accordingly, the captured image 70 illustrated in FIG. 7 includes, along with the road on which the vehicle 1 is traveling, a detected image 77 of the road surface image 11 for testing which is rendered on the road surface of this road.

The captured image 70 of the vehicle exterior camera 35 can be an image that views the road surface ahead, which is the direction of travel of the vehicle 1, from a position that is approximately at the same height as the light of sight of the driver of the vehicle 1.

Figure 8:
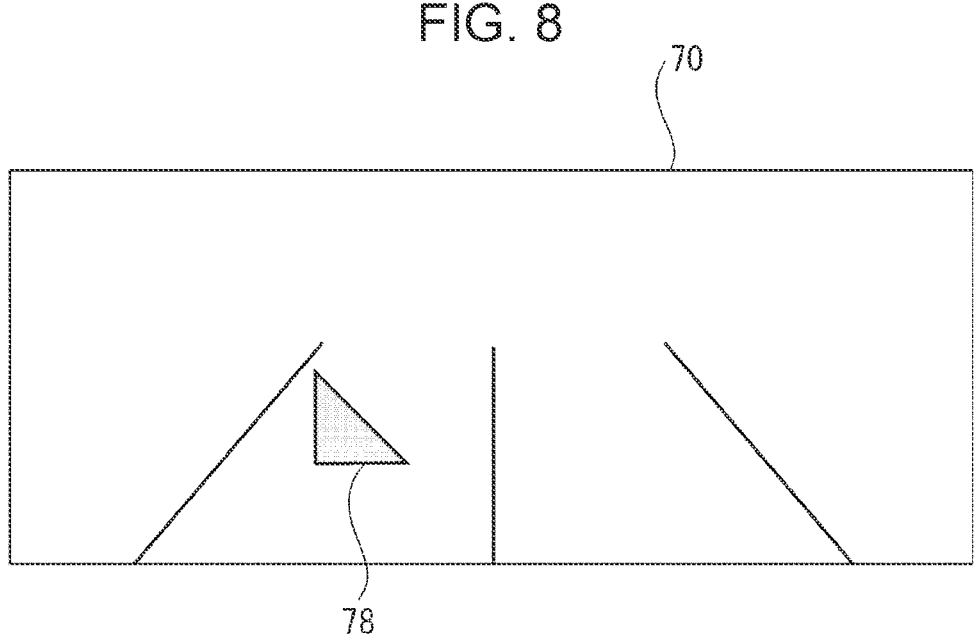
FIG. 8 is a descriptive diagram of an image captured by the vehicle exterior camera in a state where there is a defect occurring in a road surface image based on the test light projection pattern.

FIG. 8 is a descriptive diagram of the captured image 70 of the vehicle exterior camera 35 in a state where there is a defect occurring in the road surface image 11 based on a test light projection pattern.

In FIG. 8, the CPU 44 executes light projection by the light projection modules 53 to draw the road surface image 11 corresponding to a test light projection pattern on the road surface.

Accordingly, the captured image 70 illustrated in FIG. 8 includes, along with the road on which the vehicle 1 is traveling, a detected image 78 of the road surface image 11 for testing which is rendered on the road surface of this road. In the detected image 78 illustrated in FIG. 8, the upper right part of the road surface image 11 corresponding to the test light projection pattern is missing. In addition, for example, in the detected image 78 of the road surface image 11 for testing, deviation of the rendering position, image distortions, insufficient luminance, etc. may occur depending on the operating state of the light projection modules 53.

The captured image 70 of the vehicle exterior camera 35 can be an image that views the road surface ahead, which is the direction of travel of the vehicle 1, from a position that is approximately at the same height as the light of sight of the driver of the vehicle 1.

In this case, even if the driver of the vehicle 1 sees and recognizes the road surface image 11 for testing which is rendered on the road surface, the driver has difficulty understanding that it is the road surface image corresponding to the test light projection pattern.

Then, if the road surface image 11 for testing after cleaning has been done by the cleaning device 27 returns as illustrated in FIG. 7, the CPU 44 can start light projection for road surface image rendering from the light projection modules 53.

FIG. 9 is a flowchart of control for determining the suitability of the light projection members based on the operating state of the light projection members, executed in step ST3 of the road surface image rendering control illustrated in FIG. 5.

Based on the fact that the ignition switch 33 as the operating member has been operated into the ON state, in step ST2 of FIG. 5, the CPU 44 executes control for determining the suitability of the light projection members based on the road surface image rendering illustrated in FIG. 9 in a state where the light projection modules 53 as the light projection members are caused to execute light projection for road surface image rendering using a test light projection pattern.

In step ST41, the CPU 44 obtains the detected current value from the current sensor 36.

In step ST42, the CPU 44 computes a deviation from a reference value for the detected current value obtained in step ST41.

Here, the reference value may be a current value when the normal light projection modules 53 that are not defective are light-projecting the test light projection pattern.

In step ST43, the CPU 44 compares the deviation computed in step ST42 with a threshold.

Here, the CPU 44 may compare the absolute value (magnitude) of the deviation computed in step ST42 with the threshold.

In addition, the threshold may be a limit value according to the requested specification of the road surface image rendering.

Then, if the absolute value of the deviation computed in step ST42 is greater than or equal to the threshold, the CPU 44 advances the process to step ST45.

In contrast, if the absolute value of the deviation computed in step ST42 is not greater than or equal to the threshold, the CPU 44 advances the process to step ST44.

Accordingly, the CPU 44 can determine whether the light projection members are in a state suitable for light projection for road surface image rendering by evaluating the detected current value of the current sensor 36 through comparison with the reference value.

In step ST44, the CPU 44 determines that the light projection modules 53 are in a state suitable for light projection for road surface image rendering.

In this case, the CPU 44 may advance the process in FIG. 5 to step ST8 to start light projection for road surface image rendering from the light projection modules 53.

In step ST45, the CPU 44 determines that the light projection modules 53 are in a state unsuitable for light projection for road surface image rendering.

In this case, the CPU 44 may advance the process in FIG. 5 to step ST7 to prohibit light projection from the light projection modules 53. The road surface image 11 is no longer rendered on the road surface.

As described above, in the present embodiment, the vehicle exterior camera 35 and the current sensor 36 are provided as a detection device capable of detecting a state where the light projection modules 53 as the light projection members are projecting light. Then, the CPU 44, which serves as a controller configured to control light projection for road surface image rendering by the light projection members, causes the light projection members to execute light projection for road surface image rendering using a test light projection pattern and determines, based on detection by the detection device, whether the light projection members are in a state suitable for light projection for road surface image rendering. Moreover, if the light projection members are unsuitable for light projection for road surface image rendering, the CPU 44 prohibits light projection for road surface image rendering by the light projection members. Accordingly, in the present embodiment, if the light projection members are not operating normally when projecting light using the test light projection pattern, it is possible to prohibit light projection for road surface image rendering by the light projection members so that no road surface image is rendered.

In the present embodiment, it is possible to ensure that the light projection members operate properly in the vehicle 1 capable of performing road surface image rendering.

In particular, in the present embodiment, the CPU 44 determines whether the light projection members are in a state suitable for light projection for road surface image rendering based on the fact that the ignition switch 33, as an operating member configured to be operated by an occupant of the vehicle 1 to enable the vehicle 1 to travel, has been operated into the ON state. Accordingly, in the present embodiment, it can be ensured that, in the traveling of the vehicle 1 thereafter, the road surface image rendering is in a state where the light projection members are operating properly.

While the above embodiment is an example of an embodiment suitable for the disclosure, the disclosure is not limited thereto, and various modifications or changes can be made without departing from the spirit of the disclosure.

In the above-described embodiment, each light projection module 53 as the light projection member is provided in the right headlamp module 31 or the left headlamp module 32 in the vehicle 1, integrated with the LEDs 51 or 52 for the headlamps.

Alternatively, for example, each light projection module 53 as the light projection member may be provided as a separate body from the right headlamp module 31 or the left headlamp module 32 in the vehicle 1. Even in this case, the cleaning device 27 may clean the outer surfaces of the light projection modules 53, which are provided as separate bodies, together with the outer surfaces of the headlamp modules 31 and 32.

Moreover, one light projection module 53 may be provided in the vehicle 1, or three or more light projection modules 53 may be provided in the vehicle 1. One light projection module 53 or a third light projection module 53 may be provided in the widthwise center on the front of the vehicle.

In the disclosure, there is provided a detection device capable of detecting a state in which a light projection member is projecting light. Then, a controller configured to control light projection for road surface image rendering by the light projection member causes the light projection member to execute light projection for road surface image rendering, and determines, based on detection by the detection device, whether the light projection member is in a state suitable for light projection for road surface image rendering. Moreover, if the light projection member is not suitable for light projection for road surface image rendering, the controller prohibits light projection for road surface image rendering by the light projection member. Accordingly, in the disclosure, if the light projection member is not operating normally when projecting light, it is possible to prohibit light projection for road surface image rendering by the light projection member so that no road surface image is rendered.

Accordingly, in the disclosure, it is possible to ensure that the light projection member operates properly in the vehicle capable of performing road surface image rendering.

The CPU 44 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the CPU 44. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle with road surface image rendering functionality, the vehicle comprising:
   a light projection member configured to perform light projection for road surface image rendering toward a road surface in front of the vehicle;
   a controller configured to control the light projection for the road surface image rendering by the light projection member; and
   a detection device configured to perform detection of a state in which the light projection member is performing the light projection,
   wherein the controller is configured to
      cause the light projection member to perform the light projection for the road surface image rendering,
      determine, based on the detection by the detection device, whether the light projection member is in a state suitable for the light projection for the road surface image rendering,
      when the light projection member is suitable for the light projection for the road surface image rendering, start the light projection for road surface image rendering from the light projection member, and
      when the light projection member is unsuitable for the light projection for the road surface image rendering, prohibit the light projection for the road surface image rendering by the light projection member.

2. The vehicle with the road surface image rendering functionality according to claim 1, further comprising
   an operating member configured to be operated by an occupant of the vehicle to enable the vehicle to travel,
   wherein the controller is configured to
      when the operating member has been operated, determine whether the light projection member is in a state suitable for the light projection for the road surface image rendering.

3. The vehicle with the road surface image rendering functionality according to claim 2, wherein
   the detection device is a vehicle exterior camera configured to detect a road surface image rendered by the light projection of the light projection member, and
   the controller is configured to
      when the operating member has been operated, cause the light projection member to perform the light projection for the road surface image rendering, and
      by evaluating the road surface image included in an image captured by the vehicle exterior camera, determine whether the light projection member is in the state suitable for the light projection for the road surface image rendering.

4. The vehicle with the road surface image rendering functionality according to claim 1, wherein
   the detection device is a vehicle exterior camera configured to detect a road surface image rendered by the light projection of the light projection member, and
   the controller is configured to
      when the operating member has been operated, cause the light projection member to perform the light projection for the road surface image rendering, and
      by evaluating the road surface image included in an image captured by the vehicle exterior camera, determine whether the light projection member is in a state suitable for the light projection for the road surface image rendering.

5. The vehicle with the road surface image rendering functionality according to claim 4, wherein
   the light projection member is provided in a headlamp module,
   the vehicle further comprises a cleaning device configured to clean an outer surface of the headlamp module, and
   the controller is configured to
      upon determining that the light projection member is unsuitable for the light projection for the road surface image rendering when the light projection member performs the light projection for a first time, activate the cleaning device, and
      cause the cleaned light projection member to perform the light projection again, and, based on the detection by the detection device, determine whether the cleaned light projection member is in the state suitable for the light projection for the road surface image rendering.

6. The vehicle with the road surface image rendering functionality according to claim 5, wherein
   the detection device is a current sensor configured to detect a current value of the light projection member when the light projection member performs the light projection, and
   the controller is configured to when the operating member has been operated, cause the light projection member to perform the light projection for the road surface image rendering, and by evaluating the current value detected by the current sensor, determine whether the light projection member is in the state suitable for the light projection for the road surface image rendering.

7. The vehicle with the road surface image rendering functionality according to claim 4, wherein the light projection member is provided in a headlamp module, the vehicle further comprises a cleaning device configured to clean an outer surface of the headlamp module, and the controller is configured to upon determining that the light projection member is unsuitable for the light projection for the road surface image rendering when the light projection member performs the light projection for a first time, activate the cleaning device, and cause the cleaned light projection member to perform the light projection again, and, based on the detection by the detection device, determine whether the cleaned light projection member is in the state suitable for the light projection for the road surface image rendering.

8. The vehicle with the road surface image rendering functionality according to claim 7, wherein the detection device is a current sensor configured to detect a current value of the light projection member when the light projection member performs the light projection, and the controller is configured to when the operating member has been operated, cause the light projection member to perform the light projection for the road surface image rendering, and by evaluating the current value detected by the current sensor, determine whether the light projection member is in the state suitable for the light projection for the road surface image rendering.

9. A vehicle with the road surface image rendering functionality, the vehicle comprising:

a light projection member including a light source and configured to perform light projection for road surface image rendering toward a road surface in front of the vehicle;

circuitry configured to control the light projection for the road surface image rendering by the light projection member; and a detection device including a sensor and configured to perform detection of a state in which the light projection member is projecting light, wherein the circuitry is configured to cause the light projection member to perform the light projection for the road surface image rendering, determine, based on the detection by the detection device, whether the light projection member is in a state suitable for the light projection for the road surface image rendering, when the light projection member is suitable for the light projection for the road surface image rendering, start the light projection for the road surface image rendering from the light projection member, and when the light projection member is unsuitable for the light projection for the road surface image rendering, prohibit light projection for road surface image rendering by the light projection member.

* * * * *